US011689753B2

(12) United States Patent
Merchant et al.

(10) Patent No.: US 11,689,753 B2
(45) Date of Patent: Jun. 27, 2023

(54) USE OF STEGANOGRAPHICALLY-ENCODED DATA AS BASIS TO DISAMBIGUATE FINGERPRINT-BASED CHANNEL-MULTI-MATCH

(71) Applicant: The Nielsen Company (US), LLC, New York, NY (US)

(72) Inventors: Shashank C. Merchant, Sunnyvale, CA (US); Andrew L. Ashbacher, Aptos, CA (US)

(73) Assignee: The Nielsen Company (US), LLC, New York, NY (US)

( * ) Notice: Subject to any disclaimer, the term of this patent is extended or adjusted under 35 U.S.C. 154(b) by 37 days.

(21) Appl. No.: 15/929,217

(22) Filed: Feb. 6, 2020

(65) Prior Publication Data

US 2020/0404348 A1    Dec. 24, 2020

Related U.S. Application Data

(60) Provisional application No. 62/863,015, filed on Jun. 18, 2019.

(51) Int. Cl.
*H04N 21/2389* (2011.01)
*H04N 21/435* (2011.01)
(Continued)

(52) U.S. Cl.
CPC . *H04N 21/23892* (2013.01); *H04N 21/23424* (2013.01); *H04N 21/435* (2013.01); *H04N 21/812* (2013.01)

(58) Field of Classification Search
None
See application file for complete search history.

(56) References Cited

U.S. PATENT DOCUMENTS 10,198,442 B2    2/2019 Sharifi
2002/0118394 A1    8/2002 Mckinley et al.
(Continued)

FOREIGN PATENT DOCUMENTS

KR    20190054675    5/2019

OTHER PUBLICATIONS

International Search Report and Written Opinion from International Application No. PCT/US2020/037900, dated Sep. 25, 2020.

*Primary Examiner* — James R Marandi
(74) *Attorney, Agent, or Firm* — McDonnell Boehnen Hulbert & Berghoff LLP

(57) ABSTRACT

The disclosure provides for use of steganographically-encoded data as a basis to disambiguated a fingerprint-based channel-multimatch. A fingerprint-matching server or other entity could detect a channel-multi-match scenario by determining that query fingerprints representing media content being rendered by a content presentation device match reference fingerprints respectively representing multiple channels. In view of that detected channel-multi-match scenario, the content presentation device could then provide channel-identification information that the content presentation device extracts from a watermark that is steganographically encoded in the media content of the channel that the content presentation device is rendering, for use of the extracted channel-identification information to determine which channel the content presentation device is rendering. Identifying the channel being rendered could then facilitate channel-specific action, such as then detecting a content-modification opportunity on the identified channel and preparing and enabling the content presentation device to carry out an associated content modification.

20 Claims, 7 Drawing Sheets

(51) Int. Cl.
*H04N 21/81* (2011.01)
*H04N 21/234* (2011.01)

(56) References Cited

U.S. PATENT DOCUMENTS

| | | | |
|---|---|---|---|
| 2009/0158318 A1* | 6/2009 | Levy | G06F 21/36 |
| | | | 725/32 |
| 2011/0161086 A1* | 6/2011 | Rodriguez | G06T 1/0071 |
| | | | 704/270 |
| 2013/0097630 A1* | 4/2013 | Rodriguez | G06Q 30/0241 |
| | | | 725/32 |
| 2014/0229970 A1 | 8/2014 | Besehanic | |
| 2017/0013324 A1 | 1/2017 | Chen | |
| 2018/0098122 A1 | 4/2018 | Cho et al. | |
| 2018/0302669 A1* | 10/2018 | Seo | E04F 13/0887 |
| 2019/0182541 A1* | 6/2019 | Seo | H04H 60/43 |
| 2020/0092515 A1* | 3/2020 | Stern | H04N 21/43635 |

* cited by examiner

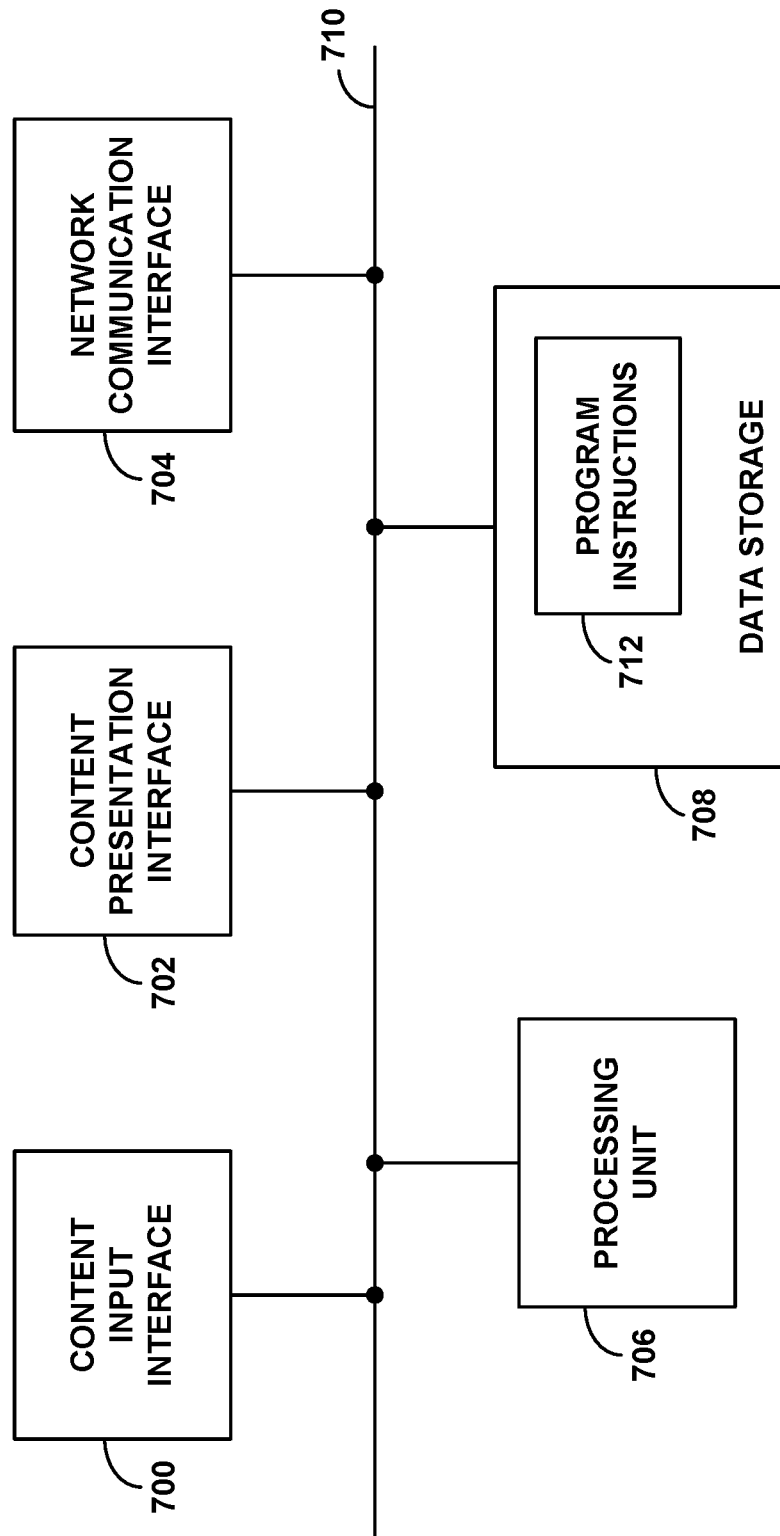

USE OF STEGANOGRAPHICALLY-ENCODED DATA AS BASIS TO DISAMBIGUATE FINGERPRINT-BASED CHANNEL-MULTI-MATCH

REFERENCE TO RELATED APPLICATION

This application claims priority to U.S. Provisional Patent Application No. 62/863,015, filed Jun. 18, 2019, the entirety of which is hereby incorporated by reference.

BACKGROUND

A typical content presentation device operates to receive an analog or digital media stream representing media content such as video and/or audio content and to render and present the media content on a user interface such as a display screen and/or an audio speaker. Examples of such devices include, without limitation, televisions, computer monitors, projection systems, loudspeakers, headphones, and the like.

In many cases, such a content presentation device may be in communication with a receiver, such as a local set top box or other similar device or a remote server, that has access to numerous discrete channels of media content and that can selectively deliver a given such channel's media content to the content presentation device for playout.

By way of example, a television may be communicatively linked by a High-Definition Multimedia Interface (HDMI) cable or other interface with a cable-TV set top box that has access to a set of cable-TV channels, and the set top box may be configured to receive user input selecting a particular channel and to responsively tune to the selected channel and output to the television the media content of the selected channel, for presentation of the media content to a user. As another example, a loudspeaker may be communicatively linked with a radio that has access to a set of radio stations, and the radio may be configured to receive user input selecting a particular channel (station) and to responsively tune to the selected channel and output to the loudspeaker the media content of the selected channel, for presentation of the media content to a user. And as still another example, a content presentation device such as a display or speaker may be communicatively linked with a computer that has access to a myriad of online streaming media channels, and the computer may be configured to receive user input selecting a particular channel and to responsively initiate receipt and output of the selected media content and provide the media content to the display and/or speaker for presentation to a user.

SUMMARY

When a content presentation device receives and renders media content, the content presentation device may not have an indication of which channel of media content the content presentation device is rendering. A receiver or other device that selectively tunes to the channel and receives the media content and that provides the media content to the content presentation device may have such information, but the content presentation device that receives the media content from that other device may not have such information. For example, if a television is coupled with a cable-TV set top box and a user selects a particular cable channel on the set top box, the set top box may thereby have an indication of the selected channel as the channel on which the set top box is then receiving a media content that is being output to the television. But the television itself may merely receive and render the media content and may have no indication of the selected channel.

For various reasons, however, it may be useful to determine which of various channels is the channel that carries the content being rendered by a content presentation device. Further, it may be useful to do so without receiving from a channel-selection device (e.g., receiver or remote control) a report of the channel to which that device is tuned, and perhaps without any involvement of the channel-selection device. For instance, it may be useful for the content presentation device itself, and/or a network server working in cooperation with the content presentation device, to determine the channel based on an evaluation of the media content that is being rendered by the content presentation device.

Given knowledge of the channel that the content presentation device is rendering, the network server and/or another entity could then carry out one or more operations keyed to the channel, such as determining and recording an extent to which media content of that channel is being played, selectively replacing a predetermined portion of the media content with alternative content (such as dynamically inserting a replacement advertisement), or superimposing channel-specific content over the media content for presentation along with the media content, among numerous other possibilities.

One method to determine the channel that the content presentation device is rendering is to apply fingerprint-based automatic content recognition (ACR). With fingerprint-based ACR, an entity could be provisioned with reference data that includes digital reference fingerprints respectively representing each of various known channels of media content (e.g., each of the channels within a subscription plan for a set-top box that supplies media content to the content presentation device) and that maps the reference fingerprints to the respective channels that they represent. Further, the entity could be provided with digital query fingerprints that represent the media content currently being rendered by the content presentation device, and the entity could compare the query fingerprints with the reference fingerprints in an effort to find a match. Upon finding that the query fingerprints match the reference fingerprints mapped to a particular channel, the entity could thus determine that the channel being rendered by the content presentation device is that particular channel.

In an example implementation of fingerprint-based ACR, a content distribution system that is configured to distribute various known channels of media content to content presentation devices could regularly provision a fingerprint-matching server with reference data to enable the fingerprint-matching server to conduct the fingerprint analysis. In particular, for each of various channels, the content distribution system could generate timestamped reference fingerprints on a per-frame basis or other ongoing basis and could regularly transmit the reference fingerprints to the fingerprint-matching server along with information mapping each reference fingerprint to the channel that it represents.

Further, as the content presentation device receives and renders a given channel of media content, the content presentation device could generate the timestamped query fingerprints of the media content on a pre-frame basis or other ongoing basis and could regularly transmit the generated query fingerprints to the fingerprint-matching server for analysis.

On an ongoing basis or in response to one or more trigger events, the fingerprint-matching server could thus compare the query fingerprints provided by the content presentation device with the reference fingerprints provided by the content distribution system. And upon finding with sufficient certainty that the query fingerprints match reference fingerprints that the reference data maps to a particular channel, the fingerprint-matching server could reasonably conclude that that is the channel being rendered by the content presentation device.

In a representative implementation, determining the channel that the content presentation device is rendering could help facilitate dynamic content modification, such as targeted advertisement replacement.

By way of example, once the fingerprint-matching server has determined the channel that the content presentation device is rendering, the fingerprint-matching server or another entity could then use that determined channel identity as a basis to detect when a content-modification opportunity is about to occur on that channel. And the fingerprint-matching server or other entity could then responsively cause the content presentation device to carry out a content modification at the time of the content-modification opportunity.

This example channel-specific action could take advantage of a time delay that is likely to exist from the point in time when the content distribution system outputs media content of the channel for transmission to the content presentation device to the point in time when the content presentation device renders that media content. Depending on the configuration of the system, this delay could be on the order of 5-10 seconds.

Given that delay, it could be possible for the content distribution system, the fingerprint-matching server, and/or one or more other entities to detect the presence of particular content defining a content-modification opportunity on the channel of media content that is en route to the content presentation device well enough before that content arrives at the content presentation device. By engaging in relatively quick out-of-band (e.g., Internet Protocol (IP) based) communication with the content presentation device during that delay period, a server could then prepare the content presentation device to engage in content modification with respect to the detected content, so that when the detected content ultimately arrives at the content presentation device, the content presentation device could carry out the content modification in a timely manner.

As to content modification, for instance, the fingerprint-matching server could be provisioned in advance with modifiable-content segment data that includes digital fingerprints respectively representing each of various modifiable-content segments of media content, along with associated metadata per modifiable-content segment, such as a duration of the segment, an identifier of the segment, a type of associated content modification (e.g., replacement or overlay) and the like. For instance, a content management system could generate and provide this information in advance to the fingerprint-matching server.

Having identified the channel being rendered by the content presentation device, the fingerprint-matching server could then compare the ongoing reference fingerprints representing that identified channel with the fingerprints representing the various modifiable-content segments. And upon finding with sufficient certainty that the reference fingerprints of the identified channel match the fingerprints representing a particular modifiable-content segment, the fingerprint-matching server could reasonably conclude that the media content en route to the content presentation device includes that modifiable-content segment. Further, the fingerprint-matching server could thereby determine from the reference data of the identified channel the frame-timestamp or other timing information indicating when the modifiable-content segment is present on the channel.

Upon so detecting the presence of a modifiable-content segment in the media content of the channel en route to the content presentation device, the fingerprint-matching server and/or another entity could then responsively engage in out-of-band signaling with the content presentation device to enable and cause the content presentation device to perform a content modification with respect to that modifiable-content segment.

For instance, the fingerprint-matching server could provide the content presentation device with timing information regarding the upcoming content-modification opportunity. The timing information regarding the upcoming content-modification opportunity could include frame-timestamp information or other timing information that informs the content presentation device when the modifiable-content segment will be present on the channel of media content that the content presentation device is receiving and rendering. For example, this could include a frame-timestamp of the start of the modifiable-content segment on the channel and a duration of the modifiable-content segment and/or frame-timestamp of the end of the modifiable-content segment on the channel. With this timing information, the content presentation device could accordingly plan to carry out a content modification at the time of the modifiable-content segment.

Further, the fingerprint-matching server could provide the content presentation device with various other information regarding the modifiable-content segment, to enable the content presentation device to carry out the content modification at the indicated time of the modifiable-content segment. For instance, the fingerprint-matching server could provide the content presentation device with metadata as described above, such as a duration of the segment, an identifier of the segment, and a type of associated content modification (e.g., replacement or overlay) and the like.

With this information, the content presentation device could then responsively work with the content management system and/or another entity to obtain details of the content modification to perform with respect to the upcoming modifiable-content segment. For instance, the content presentation device could transmit to the content management system a request that provides the content management system with the modifiable-content segment identifier and other associated metadata about the modifiable-content segment. And the content management system could responsively provide the content presentation device with information to facilitate the content modification.

The content management system could use various information as a basis to determine supplemental content that the content presentation device should render in place of or as an overlay superimposed on the modifiable-content segment. For instance, the content management system could user-demographics, location, or other information regarding the content presentation device as a basis to determine appropriate supplemental content.

Further, the content management system could ascertain a storage location of determined supplemental content and could provide the content presentation device with an indication of that storage location. For instance, the content management system could query a supplemental-content delivery system to determine a uniform resource locator (URL) or other address from which the content presentation device could obtain the supplemental content from a network server or from local data storage of the content presentation device. And the content management system could provide the content presentation device with that address and/or with other information to enable the content presentation device to obtain the supplemental content, or the content management system could itself provide the content presentation device with the supplemental content.

With this information, the content presentation device could thus obtain the supplemental content and could plan to present the supplemental content (e.g., as replacement or overlay) at the time of the modifiable-content segment on the channel that the content presentation device is rendering.

In addition, the fingerprint-matching server could work with the content presentation device to help confirm that the channel to which the content presentation device is tuned remains the identified channel, as a condition for the content presentation device carrying out, and/or continuing to carry out, the content modification.

For instance, the fingerprint-matching server could also transmit to the content presentation device a set of the reference fingerprints representing certain media content of the identified channel, such as the reference fingerprints representing frames of the identified channel for a period of time leading up to the time when the modifiable-content segment is present on the channel and continuing through the duration of the modifiable-content segment on the channel.

The content presentation device could then compare those reference fingerprints with the query fingerprints that the content presentation device generates representing the channel currently being rendered by the content presentation device, to confirm that the content presentation device is still rendering the identified channel up until the time the content modification is to start. And if the content presentation device finds with sufficient certainty that the query fingerprints continue to match those reference fingerprints up until the time when the content modification is to start, then the content presentation device could proceed with the content modification at the planned time. Whereas, if the content presentation device finds a sufficient mismatch between the query fingerprints and the reference fingerprints before the time when the content modification is to occur, the content presentation device could responsively abandon the planned content modification, on grounds that the content presentation device is likely now rendering a different channel.

Further, while the content presentation device is presenting the modified content, the content presentation device could continue to compare the provided reference fingerprints with the query fingerprints that the content presentation device generates of the underlying identified channel (e.g., of the underlying channel of media content that the content presentation device is receiving), to determine whether the content presentation device should continue with the content modification. If the content presentation thus finds with sufficient certainty that the query fingerprints continue to match the reference fingerprints, then the content presentation device could continue with the content modification. Whereas, if the content presentation device finds a sufficient mismatch between the query fingerprints and the reference fingerprints during the course of the modifiable-content segment in the underlying channel content, then the content presentation device could responsively discontinue and thus abandon the content modification, so as to avoid continuing to apply the content modification to the likely different channel that the content presentation device is now rendering.

The content-modification process described so far could be carried out for various purposes. Without limitation, for instance, the content-modification process could be carried out to facilitate dynamic advertisement insertion (DAI), in which the content presentation device replaces a generally applicable ad (e.g., a nationally broadcast ad) with a replacement ad possibly selected based on location, user demographics, or other information specific to the content presentation device.

For DAI, an entity such as content broadcaster, distributor, or ad-replacement service might enter into agreements with an advertisers to facilitate replacing playout of certain ads, deemed "replaceable ads," with different ads, deemed "replacement ads." For each of various replaceable ads, the content management server or other entity could then receive a copy of the replaceable ad and could provision the fingerprint-matching server with digital fingerprints representing the replaceable ad and with associated data regarding the replaceable ad. For instance, for each replaceable ad, the content management server could generate digital fingerprints of the replaceable ad on a per-frame basis or the like and could transmit to the fingerprint-matching server the generated fingerprints of the replaceable ad along with metadata as described above, such as a unique identifier of the replaceable ad, a duration of the replaceable ad, an indication that the ad is to be replaced, and so forth.

Once the fingerprint-matching server has identified the channel being rendered by the content presentation device, the fingerprint-matching server could then responsively compare the reference fingerprints representing that identified channel with the fingerprints representing various replaceable ads. And upon finding with sufficient certainty that the reference fingerprints of the identified channel match the fingerprints representing a particular replaceable ad, the fingerprint-matching server could reasonably conclude that the channel being rendered by the content presentation device includes the replaceable ad, and more specifically that the media content en route to the content presentation device includes that replaceable ad.

In response to this conclusion, the fingerprint-matching server and/or another entity could engage in signaling with the content presentation device to prepare the content presentation device to present a replacement ad in place of the replaceable ad. In line with the discussion above, for instance, the fingerprint-matching server or other entity could transmit to the content presentation device, through out-of-band signaling, one or more messages that provide the content presentation device with (i) a frame-timestamp or other information that indicates when the replaceable ad will occur on the channel that the content presentation device is rendering, (ii) the unique identifier and duration of the replaceable ad, and (iii) reference fingerprints of representing frames of the channel at least up to and through the time of that the replaceable ad will occur.

Given the identifier and duration of the replaceable ad, the content presentation device could then engage in out-of-band signaling with the content management system to ascertain a replaceable ad that the content presentation device should render in place of the replaceable ad. Here, the content presentation device might provide the content management system with a user identification, demographics, location, and/or other information that the content management system could use as a basis to select an appropriate replacement ad. Further, the content management system could use the duration of the replaceable ad, indicated by the content presentation device or mapped to the ad-identifier of the replaceable ad for instance, to select a replacement ad that is of the same duration as the replaceable ad.

The content management system could then work with the supplemental-content delivery system to determine a URL or other address or location from which the content presentation device could obtain the replacement ad and could inform the content presentation device accordingly. And the content presentation device could thus obtain the replacement ad and plan to render the replacement ad in place of the replaceable ad on the channel that the content presentation device is rendering, as discussed above.

Further, the content presentation device could make use of the provided reference fingerprints to handle a channel change that may occur before the replaceable ad is present on the channel or during the course of the replaceable ad on the channel. As noted above, for instance, the content presentation device could continue to generate query fingerprints of the underlying channel that the content presentation device is receiving and to compare those query fingerprints with the provided reference fingerprints. And if the content presentation device thereby detects a sufficient mismatch between the query fingerprints and the reference fingerprints, the content presentation device could abandon playout of the replacement ad to avoid playing out the replacement ad on a different channel.

Unfortunately, a technical problem that can arise in identifying the channel that the content presentation device is rendering is that the same media content may be provided on multiple different channels, and so the query fingerprints of media content being rendered by the content presentation device may not match just the reference fingerprints of that channel but may also match the reference fingerprints of one or more other channels.

For example, a sports game or political event might be broadcast concurrently on multiple different channels, or a syndicated television or radio show might be broadcast concurrently on multiple different channels. In these or other scenarios, if the content presentation device is presenting media content of one of those channels and generates and provides query fingerprints of that media content, those query fingerprints could be mapped to reference fingerprints of multiple different channels, and therefore the channel-identification would be inconclusive.

As a specific example of this, consider a scenario where two different video content providers both broadcast the same sports game, each on a separate respective channel, and where an advertiser has a contract with just one of the content providers to present a targeted replacement advertisement on that provider's broadcast of the game. In this scenario, when a content presentation device is receiving and presenting one of those broadcasts, if the content presentation device generates and provides to the fingerprint-matching server query fingerprints of the broadcast being rendered, the fingerprint-matching server may find with sufficient certainty that those query fingerprints match both content providers' broadcasts of the game, and so it would be unclear whether the content presentation device should present the replacement advertisement or not.

Disclosed herein is a method and system to help disambiguate channel identification in a scenario where such ambiguity arises in fingerprint-based ACR. In particular, the disclosed method and system provide for resolving a fingerprint-based-ACR ambiguity by making use of a watermark data encoded in the media content being rendered by the content presentation device.

In accordance with the disclosure, the fingerprint-matching server or other entity could detect a channel-multi-match scenario by determining that the query fingerprint data representing the media content being rendered by content presentation device matches two or more instances of reference fingerprint data corresponding respectively with different channels than each other. Faced with that detected channel-multi-match scenario, the server or other entity could then responsively cause the content presentation device to report channel-identification information that the content presentation device extracts from a watermark that is steganographically encoded in the media content of the channel that the content presentation device is rendering.

This arrangement could make beneficial use of watermarking that is provided in the media content of the channel for the present purpose and/or for one or more other purposes. In an example implementation, for instance, the media content of the channel at issue could be watermarked with channel information to facilitate monitoring of media consumption. And the present arrangement could take advantage of that watermarking to facilitate disambiguation of a fingerprint-based ACR multi-match.

More particularly, a broadcaster or distributor of a channel of media content, or another entity associated with providing the channel, could periodically encode in the media content of each of various channels a watermark that includes a source identifier (source-ID (SID)) identifying the channel expressly or by-reference, so that metering devices in select panelist homes can decode the watermarks, read the SIDs, and report the SIDs to a data-management system facilitate tracking of media consumption. Here, however, the content presentation device itself could decode and make use of that encoded watermark data to facilitate channel disambiguation in response to a fingerprint-based ACR multi-match.

In an example implementation, when the fingerprint-matching server detects a channel-multi-match scenario as discussed above, the fingerprint-matching server could responsively engage in out-of-band signaling with the content presentation device to cause the content presentation device to report to the fingerprint-matching server an SID that the content presentation device extracts from a watermark encoded in the media content of the channel that the content presentation device is rendering.

For instance, upon encountering the fingerprint-based ACR multi-match, the fingerprint-matching server could transmit to the content presentation device a request for content presentation device to report the watermarked SID. And the content presentation device could then responsively decode the watermark data from the media content of the channel, read or otherwise determine from the decoded watermark data the SID of the channel, and report the determined SID to the fingerprint-matching server.

Having the content presentation device decode the watermark data from the media content of the channel specifically in response to the request from the fingerprint-matching server, or otherwise in response to a fingerprint-based ACR multi-match, could help to conserve processing power at the content presentation device by avoiding a need for the content presentation device to regularly engage in such decoding. Alternatively, however, other implementations could involve the content presentation device regularly decoding the watermark data, in which case the content presentation device might respond to the fingerprint-matching server's request with a SID that the content presentation device has most recently determined from the watermark data.

The SID thereby reported by the content presentation device could inform the fingerprint-matching server or another entity of the channel that is being rendered by the content presentation device. For instance, the SID could be a value that itself uniquely identifies the channel as a specific channel provided by a specific broadcaster, distributor, or the like. Or the SID could be data that could be translated to the channel identity, possibly taking into account one or more additional factors, such as location of the content presentation device, among other possibilities.

The channel identity so determined based on the watermark data encoded in the channel being rendered by the content presentation device could thus establish which single channel the content presentation device is rendering. Thus, when the fingerprint-matching server has determined that the query fingerprints of the channel being rendered by content presentation device match the reference fingerprints respectively of each of multiple channels defining a multi-match group, the fingerprint-matching server could use the channel identity so determined based on the watermark data encoded in the channel being rendered by the content presentation device as a basis to determine which channel in the multi-match group is the channel that the content presentation device is rendering.

Having so disambiguated the fingerprint-based ACR ambiguity, the fingerprint-matching server could then carry out, and/or cause to be carried out, one or more channel-specific operations such as those described above. For instance, the fingerprint-matching server could then evaluate the reference fingerprints of that determined channel to detect on the channel a modifiable-content segment such as a replaceable ad, and the fingerprint-matching server and/or another entity could respond to the detecting of the modifiable-content segment on the channel by engaging in signaling with the content presentation device to prepare and cause the content presentation device to carry out a content modification such as ad replacement if appropriate. Further or alternatively, the fingerprint-matching server could report associated channel consumption to the data management system or the like.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 7 is a simplified block diagram of an example content presentation device that could operate in accordance with the disclosure.

DETAILED DESCRIPTION

Figure 1:
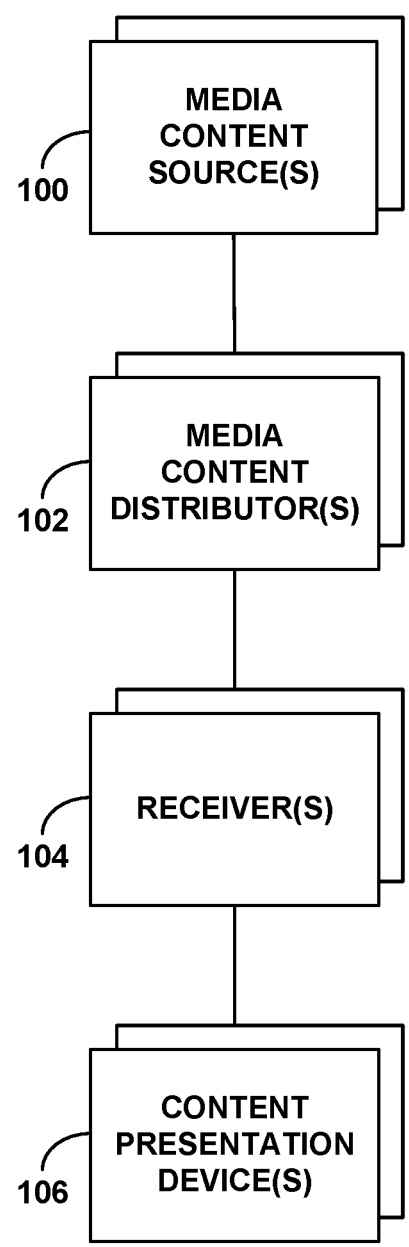
FIG. 1 is a simplified block diagram of an example system in which various disclosed principles can be applied.

Referring to the drawings, as noted above, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 100 (e.g., broadcasters, web servers, etc.), one or more media content distributors 102 (e.g., multi-channel distributors, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., televisions or other display devices, loudspeakers or other audio output devices, etc.)

In practice, for instance, the media content sources 100 could be national broadcasters, such as ABC, NBC, CBS, FOX, HBO, and CNN, the media content distributors 102 could be local affiliates and/or other local content distributors in designated market areas (DMAs), and the receivers 104 and content presentation devices 106 could then be situated at customer premises, such as homes or business establishments. With this or other arrangements, the content sources 100 could deliver media content to the content distributors 102 for distribution to receivers 104 at customer premises, and the content distributors could distribute the media content to the receivers 104 on discrete channels (e.g., particular frequencies or other defined channels). Each receiver could then respond to user input or one or more other triggers by tuning to a selected channel and outputting to a content presentation device 106 the media content that is arriving on the selected channel. And the content presentation device 106 could receive and render the media content (e.g., display or otherwise present the content).

In this or other arrangements, as noted above, as the content presentation device receives and renders this media content, the content presentation device may have no indication of the channel on which the media content is arriving, i.e., of the channel to which the receiver is tuned. Rather, the content presentation device may be configured simply to receive the media content as a media stream from the receiver and to render the received media content. Per the present disclosure, however, the content presentation device may be in communication with a network server and may work with the network server to facilitate identification of the channel and thus to facilitate taking useful channel-specific action.

Figure 2:
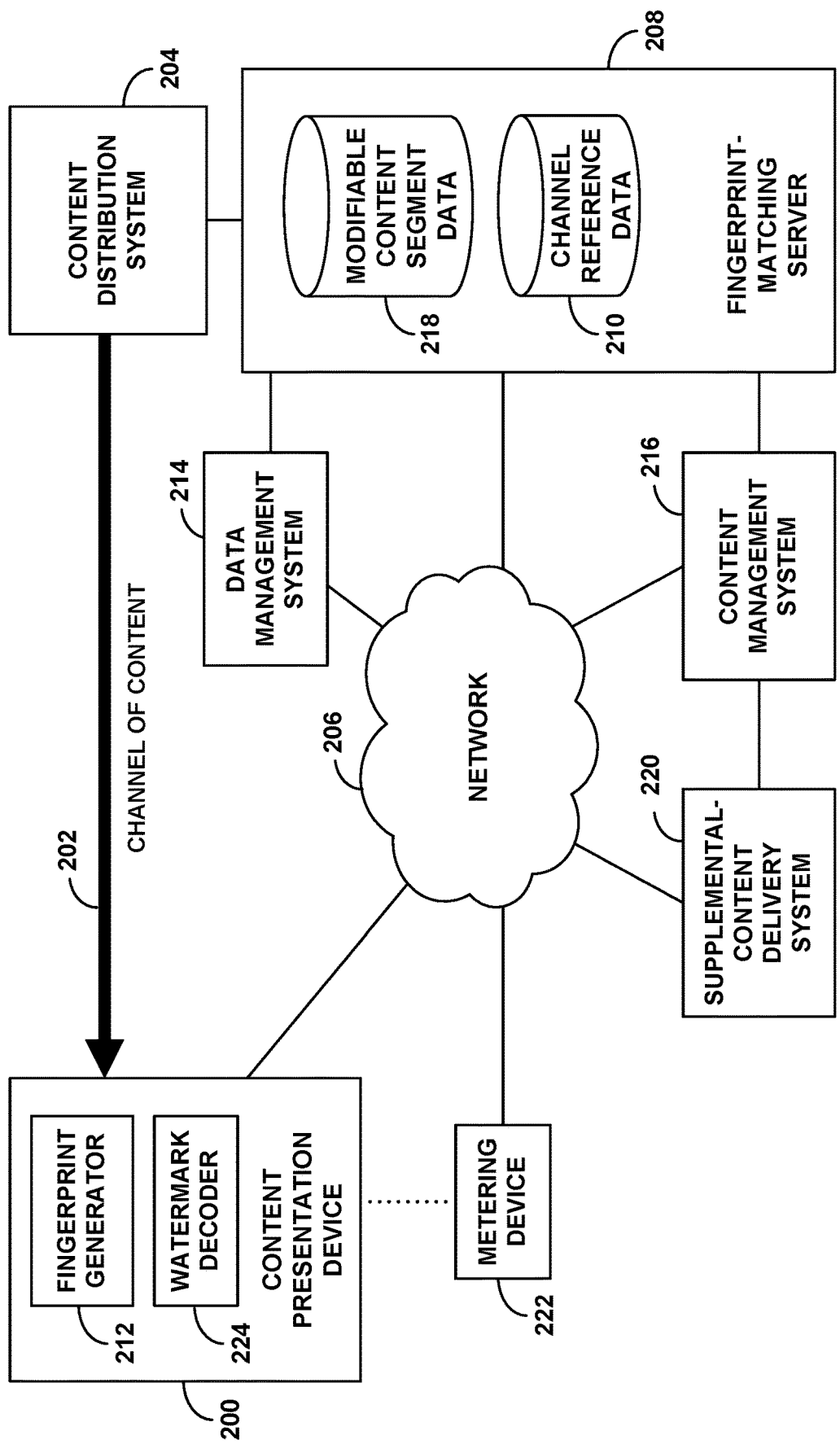
FIG. 2 is another simplified block diagram of an example system in which various disclosed principles can be applied.

FIG. 2 illustrates more specifically an example system in which the presently disclosed features could be implemented.

FIG. 2 shows at its top a representative content presentation device 200 receiving a channel of content 202 being provided by a content distribution system 204. By way of example, the content presentation device 200 could be an example content presentation device 100 as shown in FIG. 1, and the content distribution system 204 could comprise a representative media content source 100 and/or media content distributor 102 as shown in FIG. 1.

As such, the content presentation device 200 could be receiving and rendering the channel of content as a linear broadcast feed directly or indirectly from the content distributor system 204 through any of a variety of distribution channels, such as but not limited to cable, satellite, terrestrial over-the-air broadcast, broadband streaming, or others now known or later developed.

In an example implementation, the media content of the channel could define a sequence of digital frames of media content that the content presentation device is configured to render for presentation to a user. The content distributor system 204 might be broadcasting this sequence of frames encapsulated in a transport stream for receipt by a set top box, tuner, or other receiver that is tuned to the channel, and the receiver may be extracting the sequence of frames from the transport stream and outputting the sequence of frames for presentation by the content presentation device.

As further shown in FIG. 2, the content presentation device 200 is interconnected with a communication network 206, such as the Internet. For instance, the content presentation device 200 may sit as a node on a local area network (LAN) at customer premises, with the content presentation device having an assigned Internet Protocol (IP) address on the LAN and the LAN having an IP address on the network 206. The content presentation device 200 could thus engage in data communication with various entities via the network 206 while the content presentation device 200 is receiving and rendering the channel of content 202 provided by the content distribution system 204.

Shown accessible via the network 206 (e.g., at a defined IP address on the network) is a fingerprint-matching server 208, which as noted above could operate to engage in fingerprint-based ACR processing. With this network arrangement, the content presentation device 200 could engage in IP communication with the fingerprint-matching server 206 via network 206, providing the fingerprint-matching server 208 with query fingerprints representing the media content of the channel 202 that the content presentation device 200 is rendering. And the fingerprint-matching server could compare those query fingerprints with reference fingerprints of various known channels, in an effort to determine the channel 202 that the content presentation device 200 is rendering.

As discussed above, the fingerprint-matching server 208 could be provisioned with reference data 210 that includes reference fingerprints respectively representing each of various channels accessible to the content presentation device 200. As noted above, for instance, content distribution system 204 could generate and provide this reference data to fingerprint-matching server on an ongoing basis for each of various such channels. For instance, as to each channel of media content that the content distribution system outputs, the content distribution system could generate timestamped digital reference fingerprints of frames of the media content on a per frame basis or other ongoing basis, using any digital fingerprinting process now known or later developed, and could provide the fingerprint-matching server with the timestamped digital reference fingerprints along with data identifying the associated channel (such as SID and/or other channel identification).

Without limitation, an example digital fingerprinting process could apply on a per video frame basis and could involve establishing a representation of luminosity and/or other video characteristics. For instance, for a given video frame, a fingerprint generator could programmatically divide the frame into a grid, and the fingerprint generator could measure luminosity of the frame per grid cell and generate a bit string with each bit or series of bits representing luminosity of a respective grid cell, or representing a weighted difference between the luminosity of certain defined pairs of the grid cells, or the like. Further, the fingerprint generator could apply this process continually to generate the digital fingerprint over time as a sequence of fingerprints (e.g., as a fingerprint stream). For instance, the fingerprint generator could apply this process to each frame, to each key frame, periodically, or on another defined basis, with each frame's bit string defining a digital fingerprint and/or with a specified hash, combination or series of such bit strings or other representative values defining a digital fingerprint, on a sliding window basis. Other digital fingerprinting processes could be used as well.

As the fingerprint-matching server receives this reference data including the generated reference fingerprints along with associated data, the fingerprint-matching server 208 could store the reference data in a relational database or other form suitable for ready searching and access.

The example content presentation device 200 is equipped with a fingerprint generator 212 (e.g., program instructions executable by a processor of the content presentation device 200), which is configured to generate query fingerprints representing the media content of the channel 202 that the content presentation device 200 is currently rendering. The fingerprint generator 212 could be configured to receive as input a copy of the media content of the channel as the media content arrives at the content presentation device 200 and/or is processed for presentation by the content presentation device 200, and the fingerprint generator 212 could be configured to generate the query fingerprints of the media content on a per frame basis or other ongoing basis, using the same digital fingerprinting process used to generate the reference fingerprints, so as to facilitate a comparison of the query fingerprints with the reference fingerprints.

Further, the content presentation device 200 could be configured to transmit its generated query fingerprints via network 206 to the fingerprint-matching server 208 for analysis, to facilitate fingerprint-based ACR and associated channel-specific action. By way of example, the content presentation device 200 could be configured to periodically or otherwise from time to time transmit to the server the query fingerprints representing a latest series of frames of the channel being rendered by the content presentation device 200. For instance, the content presentation device 200 could generate a message carrying the latest generated query fingerprints, along with one or more timestamps and/or other associated data, and could transmit the message to the IP address of the fingerprint-matching server 208 for analysis.

As noted above, given the query fingerprints representing media content of the channel 202 being rendered by the content presentation device 200, and given the reference data including reference fingerprints respectively representing each of various known channels, the fingerprint-matching server 208 could engage in fingerprint-based ACR processing. In particular, as noted, the fingerprint-matching server could compare the query fingerprints with the reference fingerprints in an effort to find a match.

To compare a given query fingerprint with a given reference fingerprint, the fingerprint-matching server 208 could compare corresponding portions of the fingerprints with each other to determine whether the portions match exactly or within defined tolerances. For example, the fingerprint-matching server 208 could compute a maximum deviation between the fingerprints and determine if the maximum deviation is within a predefined tolerance. Further, if the fingerprints are binary, this could be a Boolean determination or could involve computing a Hamming distance (as a count of mismatches between respective bit locations in the fingerprints), and if the fingerprints are more complex values, such as decimal values or vectors (e.g., grey values per video frame region), this could involve determining a distance between the values or vectors. Numerous other examples are possible as well.

Upon finding with sufficient certainty that the query fingerprints match the reference fingerprints of a particular channel, the fingerprint-matching server 208 could then conclude that that is the channel being rendered by the content presentation device 200.

And as further noted above, based on this identification of the channel being rendered by the content presentation device, the fingerprint-matching server 208 could then take or cause to be taken one or more useful channel-specific actions.

By way of example, the fingerprint matching server could responsively report to a data management system 214 that the content presentation device 200 is presenting the identified channel, as a record of media consumption that could help facilitate targeted advertising or other operations.

And as another example, as discussed above, the fingerprint-matching server 208 could responsively engage in processing to detect a modifiable-content segment, such as a replaceable ad, in the channel that the content presentation device is receiving and to responsively prepare and cause the content presentation device to engage in content modification (e.g., DAI) with respect to that modifiable-content segment.

As noted above, for instance, a content management system 216 may have provisioned the fingerprint-matching server 208 in advance with modifiable-content segment data 218, including fingerprints of each of various modifiable-content segments (e.g., replaceable ads) and with associated metadata. Thus, having identified the channel being rendered by the content presentation device 200, the fingerprint-matching server 208 could then responsively start comparing the reference fingerprints of that identified channel with the fingerprints of the various modifiable-content segments in an effort to find a match. And upon finding with sufficient certainty that the identified-channel reference fingerprints match the fingerprints of a specific modifiable-content segment, the fingerprint-matching server 208 could then engage in signaling to enable and cause the content presentation device 200 to carry out a content modification with respect to that modifiable-content segment.

For instance, the fingerprint-matching server could provide the content presentation device 200 with various data as noted above regarding the upcoming modifiable content opportunity, including timing information and other content-modification information for example, to enable the content presentation device 200 to obtain supplemental content. And the fingerprint-matching server 208 could provide the content presentation device 200 with certain reference fingerprints of the identified channel for use to help confirm that the content presentation device 200 continues to receive the identified channel, as a condition for starting or continuing with the content modification.

The content presentation device 200 could then engage in signaling via network 206 with the content management system 216 and perhaps with a supplemental-content delivery system 220, as discussed above, to ascertain and obtain supplemental content (e.g., a replacement ad). And the content presentation device could carry out the content modification with respect to the modifiable-content segment.

FIG. 2 additionally illustrates an example metering device 222 that is in communication with the content presentation device 200 and with network 206. As noted above, metering devices such as this could be provided in select households or other places where content presentation devices may operate, for purposes of tracking media consumption, such as to track playout of ads for instance.

The metering device 222 could be connected with content presentation device 200, perhaps as an adjunct device connected within a media input line through which the content presentation device 200 receives media content of the channel 202 that it is rendering, so that the metering device could track the media being received and rendered by the content presentation device 200. Alternatively, the metering device 222 could be situated within media-output range of the content presentation device so that it can monitor media content as that content is presented by the content presentation device 200.

To facilitate this media content monitoring, as noted above, each of various channels of media content that could be delivered to a content presentation device such as device 200 could be watermarked or otherwise steganographically encoded (i.e., alternatively using steganographic encoding other than watermarking) with a respective SID or the like that expressly or by-reference identifies the channel.

As is known in the art, watermarking involves permanently embedding or otherwise encoding information into media content in a manner that enables the information to be decoded and extracted from the media content by a receiver of the media content but that may be imperceptible to a user to whom the media content is presented. This is in contrast to inserting such information into a packet header or the like without encoding the information into the underlying media content itself. Watermarking permanently changes the media content and may be impossible to remove.

More particularly, watermarking media content could involve encoding into the media content a code that can be mapped to associated information, or perhaps more directly encoding into the media content the associated information. In an example implementation, the watermark code could be on the order of 24 bits, and the watermarking could be done in an audio component of the media content and/or in a video component of the media content, depending on the form of the media content for instance.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psychoacoustic encoding.

Examples of audio watermarks and corresponding watermark detection techniques are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for Including Codes in Audio Signals and Decoding," which issued on Jun. 9, 1998), U.S. Pat. No. 5,574,962 (entitled "Method and Apparatus for Automatically Identifying a Program Including a Sound Signal," which issued on Nov. 12, 1996), U.S. Pat. No. 5,581,800 (entitled "Method and Apparatus for Automatically Identifying a Program Including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

An example system to facilitate monitoring of media consumption could make use of audio watermarking. Thus, each of various channels of media content could be periodically audio-watermarked with a respective SID and media-timestamp information. And the metering device 222 could be configured with a watermark decoder (not shown) to regularly detect and decode such watermarks, to read the SIDs and timestamps, and to report the SID and timestamp information via network 206 to the data management system 214.

As noted above, the present disclosure provides for making use of this or other such channel watermarking for purposes of disambiguating a fingerprint-based channel-multi-match. In an example implementation, for instance, the fingerprint-matching server 208 detects a fingerprint-based channel-multi-match scenario and then responsively obtains from the content presentation device 200 a SID or other channel-identification information that the content presentation device 200 extracts from watermark encoding in the media content of the channel at issue. The fingerprint-matching server could then use the obtained channel-identification information as a basis to disambiguate the fingerprint-based channel-multi-match, determining which channel of the multi-match group is the channel that the content presentation device 200 is rendering.

To facilitate this in practice, the content presentation device 200 is additionally equipped with a watermark decoder 224 (e.g., program instructions executable by a processor of the content presentation device 200) that is configured to decode watermarks from media content of the channel that the content presentation device 200 is rendering. This watermark decoder 224 could decode watermarks of the media in much the same way as other watermark decoders would, and the content presentation device 200 could be configured to determine from the decoded watermark the SID of the channel and to report the determined SID to the fingerprint-matching server 208 to facilitate disambiguation of the fingerprint-based channel-multi-match.

In practice, the content presentation device 200 might have reason to decode such watermark data from the media content of the channel other than for purposes of disambiguating a fingerprint-based channel-multi-match. Alternatively, to conserve processing power for instance, the content presentation device might not otherwise decode the watermark data but might work to do specifically in response to the fingerprint-based multi-match scenario, particularly upon receipt of signaling from the fingerprint-matching server 208 in that situation to trigger the watermark decoding and SID reporting. Making use of the watermark decoder 224, the content presentation device 200 could then scan for and find a next instance of a watermark encoded SID in the media stream of the channel, and the content presentation device 200 could decode that watermark, determine (e.g., read) the SID from the decoded watermark, and report the determined SID to the fingerprint-matching server 208.

In an example implementation, the fingerprint-matching server 208 could detect a fingerprint-based channel-multi-match in various ways.

As one example, as the fingerprint-matching server 208 receives query fingerprints from the content presentation device 200 and compares the query fingerprints with the reference fingerprints respectively representing various known channels, the fingerprint-matching server 208 could find with reasonable certainty that the query fingerprints match the reference fingerprints respectively of multiple channels. Thus, at that time, the content presentation device 200 could identify a multi-match group of channels as the channels whose reference fingerprints each match the query fingerprints of the channel being rendered by the content presentation device 200.

As another example, as the fingerprint-matching server 208 receives (e.g., from the content distribution system 204) reference fingerprints respectively representing each of various known channels, the fingerprint-matching server 208 could compare each channel's reference fingerprints with each other channel's reference fingerprints. And through this comparison, the fingerprint-matching server could identify and flag a group of channels as having the same media content as each other. As or when the fingerprint-matching server 208 receives the query fingerprints from the content presentation device 200, the fingerprint-matching server 208 could then determine that the query fingerprints match reference fingerprints of a given channel. And based on that given channel being a member of the flagged multi-match group, the fingerprint-matching server could conclude that the reference fingerprints of each channel of the flagged multi-match group match the query fingerprints of the channel being rendered by the content presentation device 200.

Note also that the process of detecting a multi-match situation involving two or more channels' reference fingerprints could be performed even if the same media content is carried on the two or more different channels at a time delay relative to one another, i.e., where frames of the media content on one of the channels are time shifted in relation to the same frames of the media content on another one of the channels. The fingerprint matching process could account for this time shifting and could still find a match if the fingerprints otherwise match each other, such as by comparing one fingerprint over a sliding window with the other fingerprint.

Upon detecting a fingerprint-based channel-multi-match scenario through these or other processes, the fingerprint-matching server 208 could responsively transmit via network 206 to the content presentation device 200 a request for watermarked channel-identification information for the channel being rendered by the content presentation device 200. And in response to receipt of this request from the fingerprint-matching server 208, the content presentation device 200 could then transmit via network 206 to the fingerprint-matching server 208 a report of the SID or other such channel-identification information that the content presentation device 200 has extracted from watermark encoding in the media content of the channel that the content presentation device 200 is rendering.

The fingerprint-matching server could then use the obtained channel-identification information as a basis to disambiguate the fingerprint-based channel-multi-match, determining which channel of the multi-match group is the channel that the content presentation device 200 is rendering. And the fingerprint-matching server could then accordingly carry out, or cause to be carried out, one or more channel-specific actions as discussed above for instance.

Note also that, while the forgoing discussion focuses on use of watermark encoded data to facilitate disambiguation of a fingerprint-based channel-multi-match, similar principles could apply to facilitate disambiguation of other forms of content multi-match scenarios.

By way of example, consider a situation where a fingerprint-matching server may carry out fingerprint-based ACR with respect to other types of content presented by a content presentation device—such as videogame content, playout of stored media content from a data storage medium such as a digital video recorder (DVR) or optical disc or the like. In that situation, the fingerprint-matching server might be provisioned with reference fingerprints respectively for each of various content items (e.g., programs, movies, games, or the like), along with associated content identifiers. And the content presentation device might similarly generate query fingerprints of the media content that the content presentation device is rendering and transmit those query fingerprints to the fingerprint-matching server for analysis.

The fingerprint-matching server could thus compare the query fingerprints of the media content being rendered by the content presentation device with the reference fingerprints respectively of each of the various known items of content in an effort to find a match, so as to then take or cause to be taken one or more content-specific actions like the channel-specific actions described above. But in this situation, the fingerprint-matching server might likewise detect a multi-match scenario by finding with sufficient certainty that the query fingerprints of the media content being rendered by the content presentation device match the reference fingerprints respectively of multiple content items.

In response to detecting this multi-match scenario, the fingerprint-matching server could then responsively make use of watermark encoded content-identification information in the media content being rendered by the content presentation device. Here, for instance, each different instance of media content could be watermarked or otherwise steganographically encoded with content-identification information. And when the fingerprint-matching server encounters the fingerprint-based multi-match scenario, the fingerprint-matching server could transmit to the content presentation device a request to report that watermarked content-identification information.

The content presentation device could then responsively report to the fingerprint-matching server the content-identification that the content presentation device has extracted from the watermark encoding in the media content that the content presentation device is rendering. And the fingerprint-matching server could use that content-identification information as a basis to overcome the multi-match, concluding that the identified content is the content being rendered by the content presentation device. The fingerprint-matching server could then take, or cause to be taken, one or more content-based actions.

Note also that certain features described above as being carried out by the fingerprint-matching server 208 could alternatively be carried out by the content presentation device 200.

For example, the content presentation device 200 could be pre-provisioned with reference fingerprint data respectively representing each of various channels or content items, which the content presentation device 200 could cache or otherwise store for reference. As the content presentation device is then presenting media content of a particular channel or content item, the content presentation device 200 could generate query fingerprints of that media content and compare the query fingerprints with the reference fingerprints in an effort to find a match so that the content presentation device 200 could responsively take, or cause to be taken, one or more channel-specific or content-specific actions. But the content presentation device 200 could thereby detect a multi-match scenario in much the same way noted above. And in response, the content presentation device could then decode watermark data from the media content that the content presentation device is presenting and could obtain from the decoded watermark data a channel identifier or content identifier that would disambiguate the multi-match.

Further, note that the extracting of watermark encoded channel identification and reporting of that extracted channel identification could alternatively or additionally be done by an entity other than the content presentation device. Without limitation, for instance, an entity in the path of content distribution to the content presentation device, or an adjunct device interworking with the content presentation device, could carry out the extracting and reporting.

Figure 3:
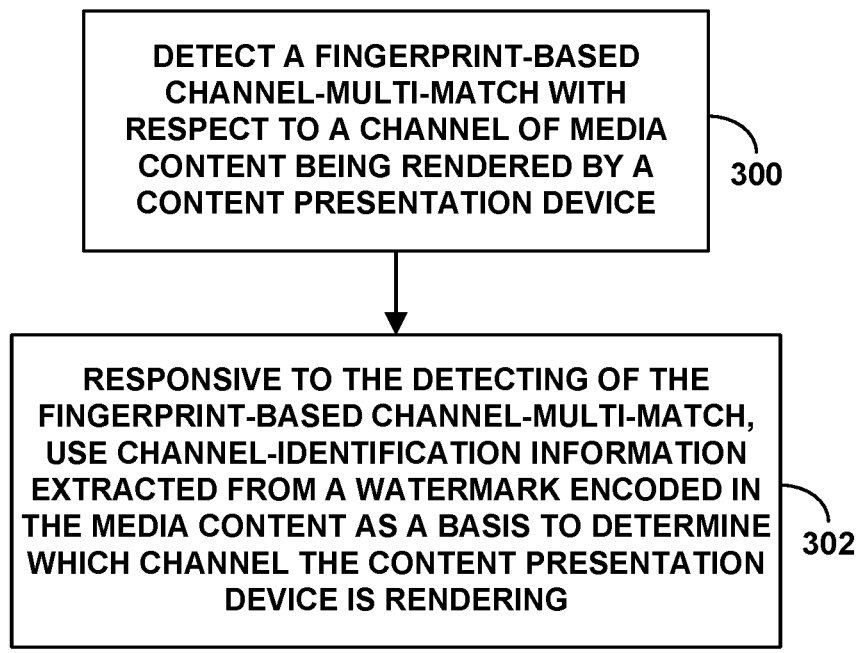
FIG. 3 is a flow chart depicting a method that could be carried out in accordance with the disclosure.

FIG. 3 is next a flow chart depicting a method that can be carried out in accordance with the present disclosure. As shown in FIG. 3, at block 300, the method includes detecting a fingerprint-based channel-multi-match with respect to a channel of media content being rendered by a content presentation device. And at block 302, the method includes, responsive to the detecting of the fingerprint-based channel-multi-match, using channel-identification information extracted from a watermark encoded in the media content as a basis to determine which channel the content presentation device is rendering.

In line with the discussion above, this method could additionally involve, based on the determining of which channel the content presentation device is rendering, causing the content presentation device to carry out a content modification in the determined channel. For instance, the method could involve causing the content presentation device to carry out DAI at a detected ad-replacement opportunity on the channel.

In addition, in an example implementation, the channel of media content that is being rendered by the content presentation device could include a video component and an audio component, in which case, in an example implementation, the fingerprint-based channel-multi-match could be with respect to the video component of the channel, and the channel-identification information could be extracted from an audio watermark encoded in the media content, among other possibilities.

Figure 4:
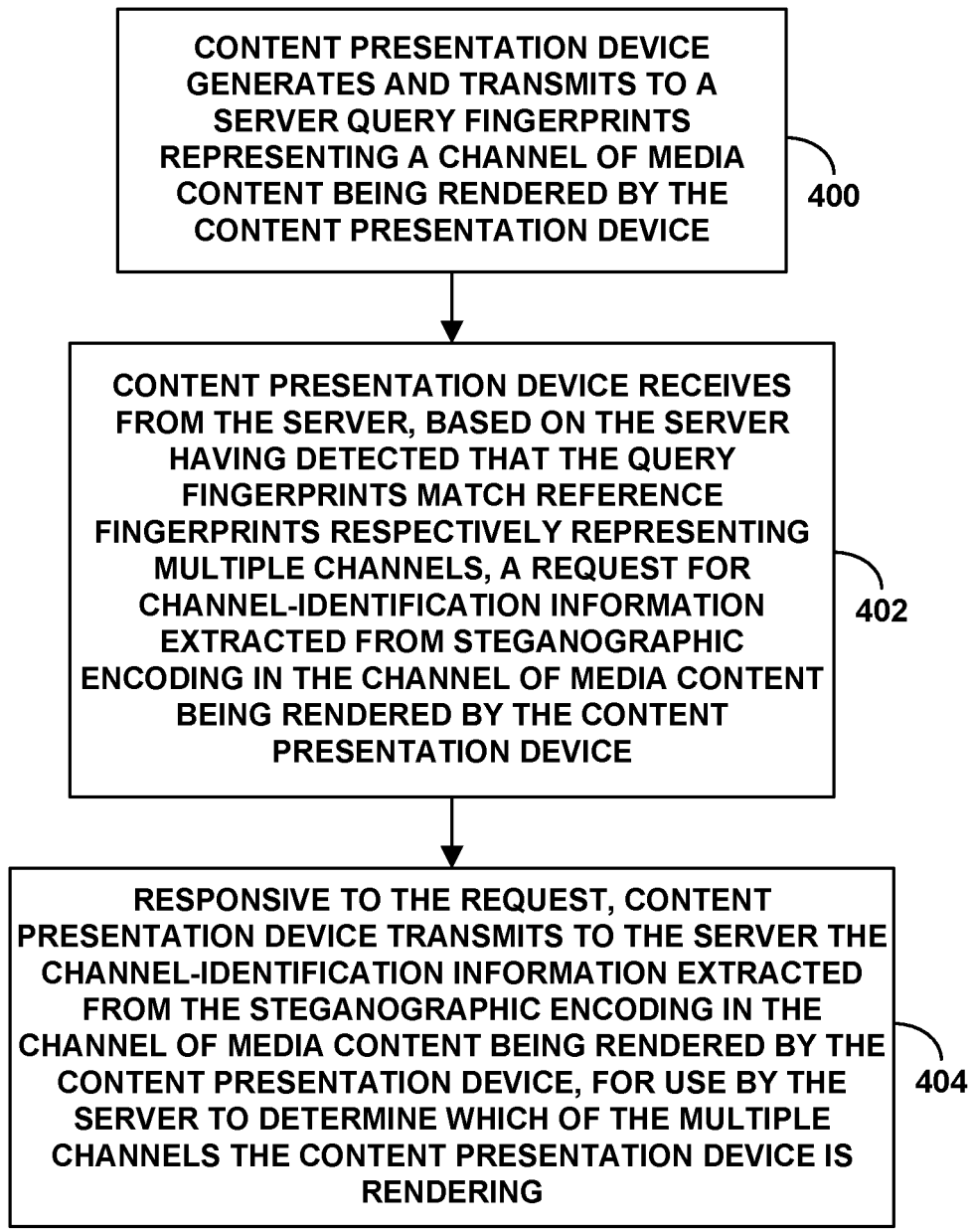
FIG. 4 is another flow chart depicting a method that could be carried out in accordance with the disclosure.

FIG. 4 is next another flow chart depicting a method that can be carried out in accordance with the present disclosure. As shown in FIG. 4, at block 400, the method includes a content presentation device generating query fingerprints representing a channel of media content being rendered by the content presentation device, and the content presentation device transmitting the generated query fingerprints to a server. At block 402, the method further involves the content presentation device receiving from the server, responsive to having sent the query fingerprints, and based on the server having detected that the query fingerprints match reference fingerprints respectively representing multiple channels, a request for channel-identification information extracted from a watermark in the channel of media content being rendered by the content presentation device. And at block 404, the method involves, responsive to the request, the content presentation device transmitting to the server the channel-identification information extracted from the watermark in the channel of media content being rendered by the content presentation device, for use by the server to determine which of the multiple channels the content presentation device is rendering.

In line with the discussion above, the method could additionally involve, responsive to the request, the content presentation device decoding the watermark and determining, from the decoded watermark, the channel-identification information to transmit to the server. Further, here too, the channel of media content being rendered by the content presentation device could include a video component and an audio component, the detecting that the query fingerprints match the reference fingerprints respectively representing multiple channels could be with respect to video, and the watermark could be an audio watermark, among other possibilities.

Figure 5:
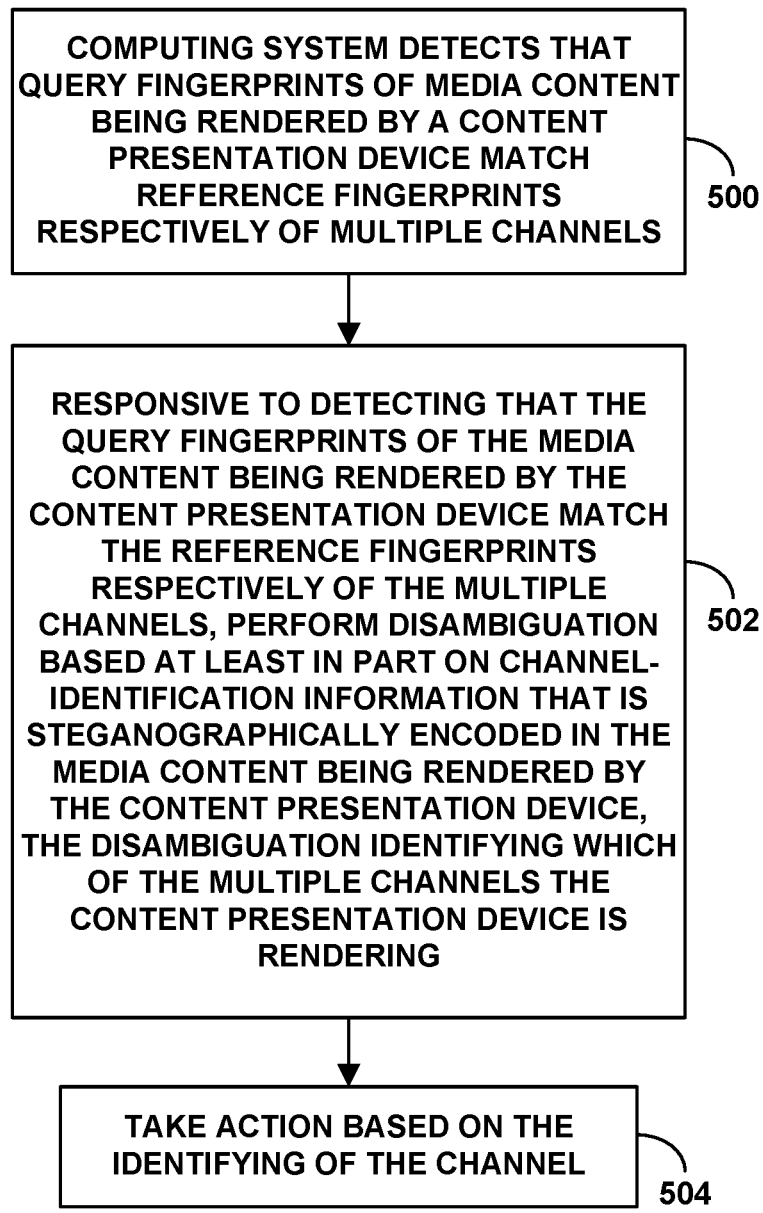
FIG. 5 is another flow chart depicting a method that could be carried out in accordance with the disclosure.

FIG. 5 is next another flow chart depicting a method that can be carried out in accordance with the present disclosure. As shown in FIG. 5, at block 500, the method includes a computing system detecting that query fingerprints of media content being rendered by a content presentation device match reference fingerprints respectively of multiple channels. Further, at block 502, the method includes, responsive to detecting that the query fingerprints of the media content being rendered by the content presentation device match the reference fingerprints respectively of the multiple channels, performing disambiguation based at least in part on channel-identification information that is steganographically encoded (e.g., watermark-encoded) in the media content being rendered by the content presentation device, the disambiguation resulting in identifying which of the multiple channels the content presentation device is rendering. And at block 504, the method includes taking action based on the identifying of the channel.

In line with the discussion above, the computing system could be an entity other than the content presentation device, the query fingerprints of the media content being rendered by the content presentation device could be generated by the content presentation device, and the method could additionally involve the computing system receiving, from the content presentation device, the query fingerprints of media content being rendered by the content presentation device. Further, the method could also include the computing system receiving the reference fingerprints from one or more content distribution systems.

As additionally discussed above, in this method, the act of performing the disambiguation based at least in part on the channel-identification information that is steganographically encoded in the media content being rendered by the content presentation device could involve causing the content presentation device to report the channel-identification information that is steganographically encoded in the media content being rendered by the content presentation device. For instance, this could involve transmitting to the content presentation device a request that causes the content presentation device to decode and report the steganographically encoded channel-identification.

In addition, similar to the discussion above, the media content being rendered by the content presentation device could include a video component and an audio component, the query fingerprints and reference fingerprints could both represent video, and the channel-identification information could be steganographically encoded in the audio component of the media content being rendered by the content presentation device, among other possibilities.

Still further, as discussed above, the action that is taken based on the identified channel could involve detecting a content-modification opportunity in the identified channel based on a comparison of reference fingerprints of the identified channel with fingerprints of a modifiable-content segment (e.g., a replaceable ad) and, responsive to detecting the content-modification opportunity in the identified channel, enabling and preparing the content presentation device to carry out a content modification with respect to the detected content-modification opportunity (e.g., playing out a replacement ad in place of the replaceable ad).

Alternatively or additionally, the action that is taken based on the identified channel could involve reporting presentation of the identified channel for use in a channel ratings system, to track media consumption and to facilitate associated operations such as targeted advertising or the like.

Figure 6:
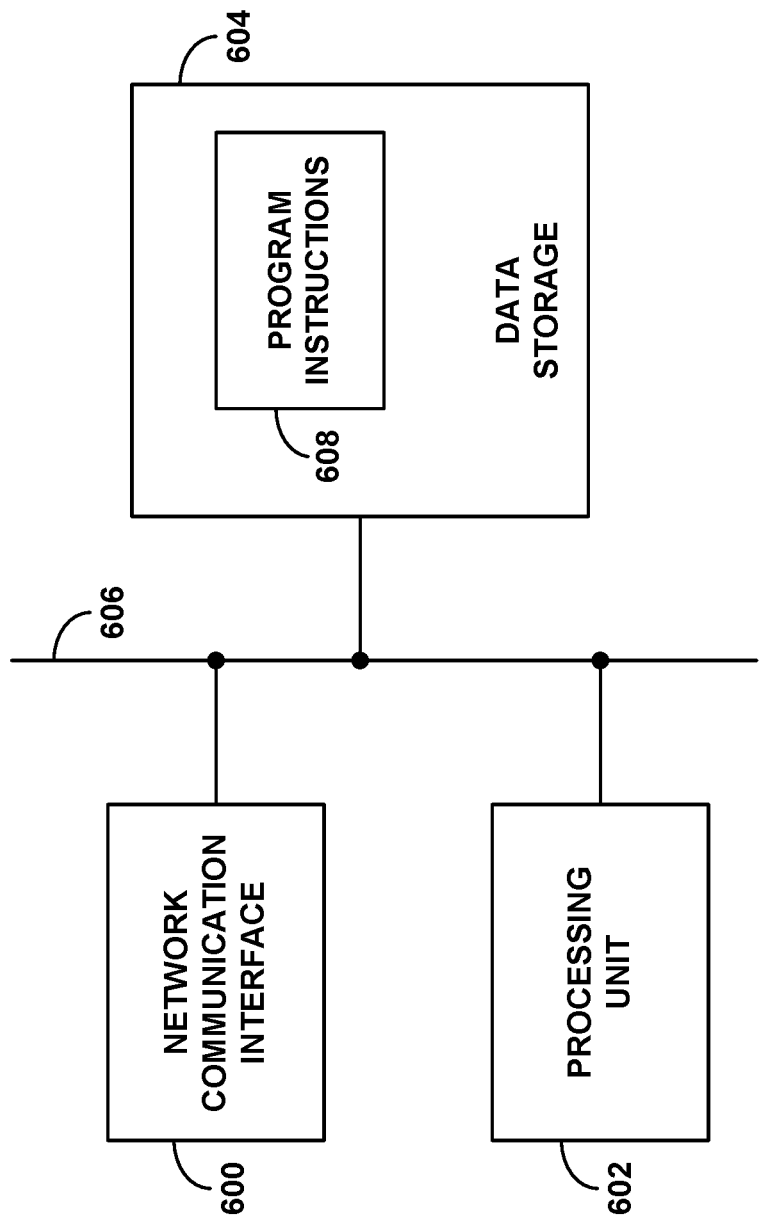
FIG. 6 is a simplified block diagram of an example system that could operate in accordance with the disclosure.

FIG. 6 is next a simplified block diagram of an example system operable in accordance with the present disclosure. This system could represent a fingerprint-matching server as described above, and/or one or more other entities (possibly including the content presentation device). As shown in FIG. 6, the example system includes a network communication interface 600, a processing unit 602, non-transitory data storage 604, any or all of which could be integrated together or, as shown, communicatively linked together by a system bus, network, or other connection mechanism 606.

Network communication interface 600 could comprise one or more physical network connection mechanisms to facilitate communication on a network such as network 206 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 602, could comprise one or more general purpose processors (e.g., microprocessors) and/or one or more specialized processors (e.g., application specific integrated circuits). And non-transitory data storage 604 could comprise one or more volatile and/or non-volatile storage components, such as optical, magnetic, or flash storage for instance.

As shown, data storage 604 of the example system stores program instructions 608, which could be executable by processing unit 602 to carry out (e.g., to cause the system to carry out) various operations described herein. For example, the program instructions could be executable to detect a fingerprint-based channel-multi-match with respect to a channel of media content being rendered by a content presentation device, and, responsive to the detecting of the fingerprint-based channel-multi-match, using channel-identification information extracted from a watermark encoded in the media content as a basis to determine which channel the content presentation device is rendering.

Various features described above could be applied in this context as well, and vice versa.

Finally, FIG. 7 is a simplified block diagram of an example content presentation device operable in accordance with the present disclosure. In line with the discussion above, this content presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 7, the example content presentation device includes a content input interface 700, a content presentation interface 702, a network communication interface 704, a processing unit 706, and non-transitory data storage 708, any or all of which could be integrated together or, as shown, communicatively linked together by a system bus, network, or other connection mechanism 710.

Content input interface 700 could comprise a physical communication interface for receiving media content to be presented by the content presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others, and/or a tuner and/or receiver for receiving content more directly from a content distributor or the like.

Content presentation interface 702 could then comprise one or more components to facilitate presentation of the received media content. By way of example, the content presentation interface could comprise a user interface such as a display screen and/or a loudspeaker, as well as one or more drivers or other components for processing the received media content to facilitate presentation of the content on the user interface.

Network communication interface 704 could comprise a physical network connection mechanism to facilitate communication on a network such as network 206 discussed above, and/or for engaging in direct or networked communication with one or more other local or remote entities. As such, the network communication interface could comprise a wireless or wired Ethernet interface or other type of network interface, for engaging in IP communication and/or other type of network communication.

Processing unit 706 could then comprise one or more general purpose processors (e.g., microprocessors) and/or one or more specialized processors (e.g., application specific integrated circuits). And non-transitory data storage 708 could comprise one or more volatile and/or non-volatile storage components, such as optical, magnetic, or flash storage. Further, as shown, data storage 708 stores program instructions 712, which could be executable by processing unit 706 to carry out (e.g., to cause the content presentation device to carry out) various operations described herein.

For example, the program instructions 712 could be executable to generate and transmit to a server query fingerprints representing a channel of media content being rendered by the content presentation device. Further, the program instructions 712 could be executable to receive from the server, based on the server having detected that the query fingerprints match reference fingerprints respectively representing multiple channels, a request for channel-identification information extracted from watermark in the channel of media content being rendered by the content presentation device. And the program instructions 712 could be executable to transmit to the server the channel-identification information extracted from the watermark in the channel of media content being rendered by the content presentation device, for use by the server to determine which of the multiple channels the content presentation device is rendering.

Various features described above could be applied in this context as well, and vice versa.

Further, the present disclosure also contemplates at least one non-transitory computer readable medium encoded with or otherwise embodying program instructions executable by at least one processing unit to carry out various operations as described herein.

Exemplary embodiments have been described above. Those skilled in the art will understand, however, that changes and modifications may be made to these embodiments without departing from the true scope and spirit of the invention.

What is claimed is:

1. A method comprising:
   detecting a fingerprint-based channel-multi-match with respect to a channel of media content being rendered by a content presentation device; and
   responsive to the detecting of the fingerprint-based channel-multi-match, (i) causing the content presentation device to scan for, detect, and decode a watermark encoded in the media content so as to extract channel-identification information from the watermark and (ii) using the channel-identification information extracted from the watermark encoded in the media content as a basis to determine which channel the content presentation device is rendering.

2. The method of claim 1, further comprising, based on the determining of which channel the content presentation device is rendering, causing the content presentation device to carry out a content modification in the determined channel.

3. The method of claim 2, wherein the content modification comprise dynamic ad insertion.

4. The method of claim 1, wherein detecting the fingerprint-based channel-multi-match with respect to the channel of media content being rendered by the content presentation device is based on a comparison of query fingerprint data generated by the content presentation device with reference fingerprint data representing multiple known channels.

5. The method of claim 1, wherein causing the content presentation device to scan for, detect, and decode the watermark encoded in the media content so as to extract the channel-identification information from the watermark comprises transmitting to the content presentation device a request for the content presentation device to report watermarked channel-identification information extracted from the media content.

6. The method of claim 5, wherein the content presentation device comprises a watermark decoder, and wherein the request triggers use of the watermark decoder to decode the watermark.

7. The method of claim 1, further comprising, based on the determining of which channel the content presentation device is rendering, reporting presentation of the identified channel for use in a channel ratings system.

8. A computing system comprising:
one or more processors;
non-transitory data storage; and
program instructions stored in the non-transitory data storage and executable by the one or more processors to carry out operations including:
  detecting a fingerprint-based channel-multi-match with respect to a channel of media content being rendered by a content presentation device, and
  responsive to the detecting of the fingerprint-based channel-multi-match, (i) causing the content presentation device to scan for, detect, and decode a watermark encoded in the media content so as to extract channel-identification information from the watermark and (ii) using the channel-identification information extracted from the watermark encoded in the media content as a basis to determine which channel the content presentation device is rendering.

9. The computing system of claim 8, wherein the operations additionally include, based on the determining of which channel the content presentation device is rendering, causing the content presentation device to carry out a content modification in the determined channel.

10. The computing system of claim 9, wherein the content modification comprise dynamic ad insertion.

11. The computing system of claim 8, wherein detecting the fingerprint-based channel-multi-match with respect to the channel of media content being rendered by the content presentation device is based on a comparison of query fingerprint data generated by the content presentation device with reference fingerprint data representing multiple known channels.

12. The computing system of claim 8, wherein causing the content presentation device to scan for, detect, and decode the watermark encoded in the media content so as to extract the channel-identification information from the watermark comprises transmitting to the content presentation device a request for the content presentation device to report watermarked channel-identification information extracted from the media content.

13. The computing system of claim 12, wherein the content presentation device comprises a watermark decoder, and wherein the request triggers use of the watermark decoder to decode the watermark.

14. The computing system of claim 8, wherein the operations additionally include, based on the determining of which channel the content presentation device is rendering, reporting presentation of the identified channel for use in a channel ratings system.

15. At least one non-transitory computer-readable medium embodying program instructions executable by at least one processing unit to carry out operations comprising:
  detecting a fingerprint-based channel-multi-match with respect to a channel of media content being rendered by a content presentation device; and
  responsive to the detecting of the fingerprint-based channel-multi-match, (i) causing the content presentation device to scan for, detect, and decode a watermark encoded in the media content so as to extract channel-identification information from the watermark and (ii) using the channel-identification information extracted from the watermark encoded in the media content as a basis to determine which channel the content presentation device is rendering.

16. The at least one non-transitory computer-readable medium of claim 15, wherein the operations additionally include, based on the determining of which channel the content presentation device is rendering, causing the content presentation device to carry out a content modification in the determined channel.

17. The at least one non-transitory computer-readable medium of claim 16, wherein the content modification comprise dynamic ad insertion.

18. The at least one non-transitory computer-readable medium of claim 15, wherein detecting the fingerprint-based channel-multi-match with respect to the channel of media content being rendered by the content presentation device is based on a comparison of query fingerprint data generated by the content presentation device with reference fingerprint data representing multiple known channels.

19. The at least one non-transitory computer-readable medium of claim 15,
  wherein causing the content presentation device to scan for, detect, and decode the watermark encoded in the media content so as to extract the channel-identification information from the watermark comprises transmitting to the content presentation device a request for the content presentation device to report watermarked channel-identification information extracted from the media content, and
  wherein the content presentation device comprises a watermark decoder, and the request triggers use of the watermark decoder to decode the watermark.

20. The at least one non-transitory computer-readable medium of claim 15, wherein the operations additionally include, based on the determining of which channel the content presentation device is rendering, reporting presentation of the identified channel for use in a channel ratings system.

\* \* \* \* \*